(12) United States Patent
Hammerschmidt

(10) Patent No.: US 7,119,670 B2
(45) Date of Patent: Oct. 10, 2006

(54) TIRE PRESSURE MONITORING SYSTEM

(75) Inventor: Dirk Hammerschmidt, Villach (AT)

(73) Assignee: Infineon Technologies AG, Munich (DE)

( * ) Notice: Subject to any disclaimer, the term of this patent is extended or adjusted under 35 U.S.C. 154(b) by 0 days.

(21) Appl. No.: 10/947,953

(22) Filed: Sep. 23, 2004

(65) Prior Publication Data

US 2005/0057348 A1    Mar. 17, 2005

Related U.S. Application Data

(63) Continuation of application No. PCT/EP03/03093, filed on Mar. 25, 2003.

(30) Foreign Application Priority Data

Mar. 25, 2002   (DE)   ................... 102 13 266

(51) Int. Cl.
*B60C 23/00* (2006.01)

(52) U.S. Cl. .............. 340/447; 340/442; 340/445; 340/448; 340/539.1; 340/825.69

(58) Field of Classification Search ........ 340/442, 340/444, 445, 447, 448, 539.1, 449, 825.69; 73/146.3, 146.4, 146.5, 146.8; 116/34 R
See application file for complete search history.

(56) References Cited

U.S. PATENT DOCUMENTS

| | | | |
|---|---|---|---|
| 5,335,540 A | 8/1994 | Bowler et al. | ......... 73/146.5 |
| 5,825,286 A | 10/1998 | Coulthard | ............ 340/447 |
| 6,259,360 B1 | 7/2001 | Takamura | ............ 340/445 |
| 6,357,292 B1 * | 3/2002 | Schultz et al. | ......... 73/146.5 |
| 6,630,885 B1 * | 10/2003 | Hardman et al. | ....... 340/505 |

FOREIGN PATENT DOCUMENTS

| | | |
|---|---|---|
| DE | 196 02 593 C1 | 5/1997 |
| DE | 100 07 558 A1 | 8/2001 |
| EP | 0 989 001 A2 | 9/1999 |
| EP | 1 092 570 A1 | 10/1999 |
| EP | 1 092 569 A2 | 2/2000 |

* cited by examiner

*Primary Examiner*—Hung Nguyen
(74) *Attorney, Agent, or Firm*—Baker Botts L.L.P.

(57) ABSTRACT

In the system for monitoring tire pressure in a tire of a vehicle, temporally successive tire pressure measured values are sensed by a transmitting unit, and at least part of the tire pressure measured values is transmitted to a receiving unit with a variable frequency of occurrence, wherein the frequency of occurrence is derived from the sensed tire pressure measured values by means of a control unit.

43 Claims, 6 Drawing Sheets

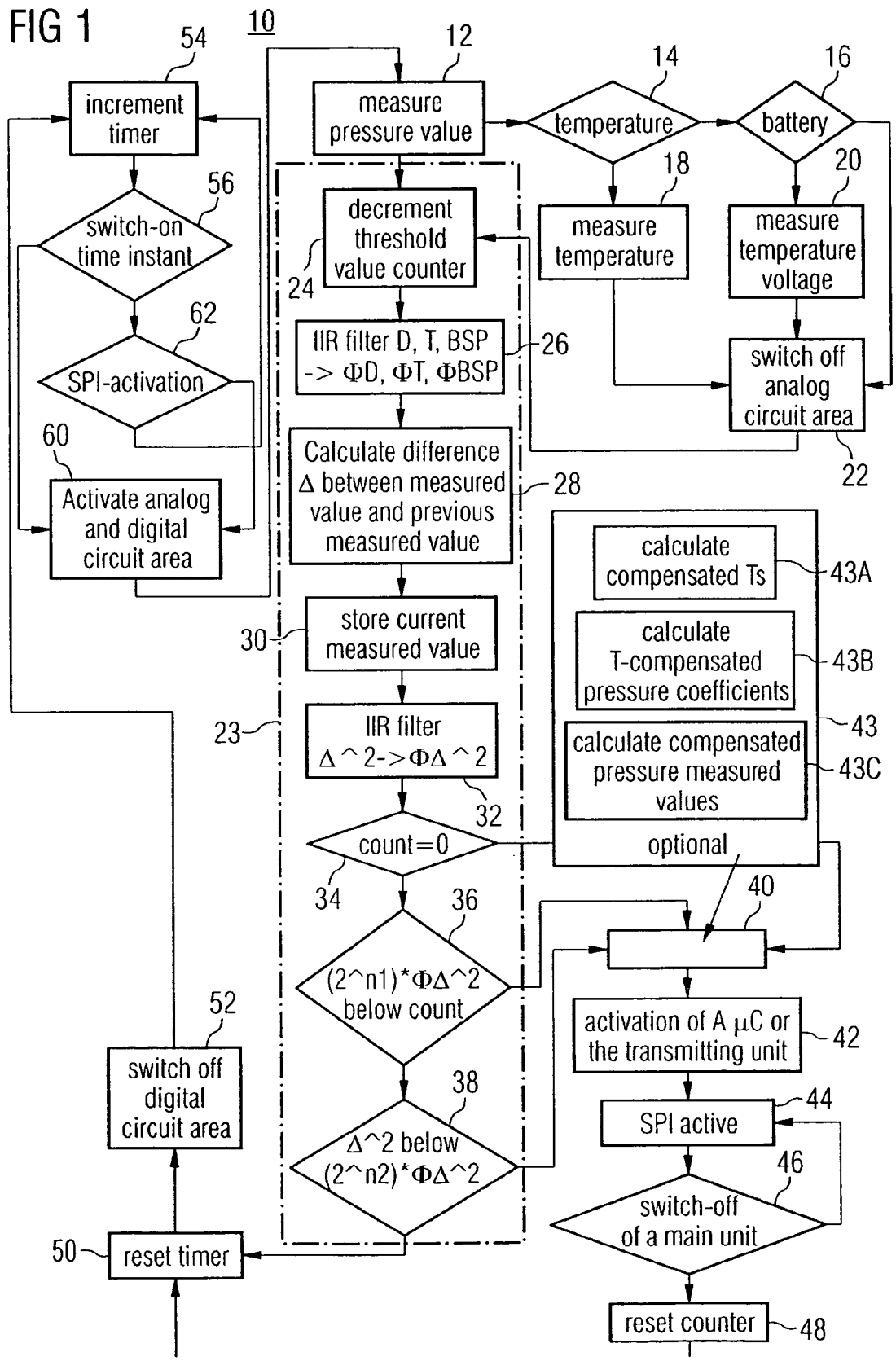

TIRE PRESSURE MONITORING SYSTEM

CROSS REFERENCE TO RELATED APPLICATION

This application is a continuation of copending International Application No. PCT/EP03/03093 filed Mar. 25, 2003 which designates the United States, and claims priority to German application no. 102 13 266.6 filed Mar. 25, 2002.

TECHNICAL FIELD OF THE INVENTION

The present invention relates to a pressure sensor system, and in particular to a system for monitoring tire pressure in a vehicle tire.

DESCRIPTION OF THE RELATED ART

In vehicle technology, greater and greater efforts are made to develop tire pressure sensor systems with which the tire pressure of a motor vehicle, e.g. a truck, car, or motorbike may be sensed. By means of such tire pressure sensor systems, pressure changes are to be passed to a central unit, e.g. the on-board computer of the vehicle, as early as possible in order to thus recognize damage of a tire as early as possible or warn the driver sufficiently early when tire pressure changes are present, because these indicate gas loss or abnormal deformation of the tire. With this, the driver of a motor vehicle may often still be warned sufficiently early of the bursting of a vehicle tire due to damage or also of a so-called "slow flat".

For the measurement and monitoring of physical state quantities, such as pressure and temperature in the gas filling of a vehicle tire, usually battery-operated sensor arrangements are employed, which pass their measured values via a transmitting unit in a wireless manner by radio from the inside of the tire, preferably at the rim, to a receiving unit attached outside the tire. The receiving unit is for example connected to the on-board computer of the vehicle. Due to the necessary battery operation of the sensor arrangement provided with the transmitting unit, the life of such sensor arrangements for tire pressure monitoring, however, is extremely limited.

Conventional sensor arrangements for sensing and monitoring the tire pressure of a vehicle tire usually use three main circuit blocks. The first circuit block is a wakeup timer, which is constantly in operation and activates the further circuit blocks of the tire pressure monitoring means, i.e. the tire pressure sensor and the transmitting unit, under defined conditions. The tire pressure sensor represents the second main circuit block and is responsible for sensing and converting the tire pressure into a digital measured value reflecting the sensed current tire pressure measured value. The transmitting unit (transmitter) of the tire pressure sensor arrangement represents the third main circuit block, wherein the transmitting unit passes the respective sensed pressure value via a high-frequency radio link to the receiving unit associated with the on-board computer.

The tire pressure sensor arrangements previously employed in the prior art additionally use an acceleration sensor to ascertain the respective driving state of the vehicle. Due to the values of the acceleration sensor, for example at a standstill of the vehicle, the measuring rate with which the tire pressure measured values are ascertained, and in particular the number of highly current-consuming RF transmissions may be reduced significantly as compared to the driving operation, in order to at least slightly reduce the power consumption of the sensor arrangement.

Moreover, in the prior art there are approaches using a fixed threshold value for changes of the tire pressure sensed from the tire pressure measured values, in order to cause unconditional communication of the respective sensed tire pressure measured value from the transmitting unit of the tire pressure sensor arrangement to an external receiving unit arranged for this, wherein the receiving unit is usually connected to vehicle electronics in order to make the sensed tire pressure measured values available to the driver via an on-board computer.

The tire pressure sensor arrangements for monitoring the tire pressure of a vehicle tire previously employed in the prior art, however, have a series of disadvantages. With the previously known battery-operated tire pressure sensor arrangements it is not possible to make continuous measurements of the tire pressure measured values over the entire life of the tire pressure sensor arrangement lying on the order of for example ten years. Yet, usual tire pressure sensor arrangements have a too high power consumption limiting the life of the battery-operated tire pressure sensor arrangement, so that a continuous measurement of the physical state quantities, such as pressure and temperature, cannot take place with a sufficiently high measurement repetition rate over the entire intended life of the sensor system. A sufficient measurement repetition rate is fixed by the time distance during which change of the tire pressure is to be recognized at the latest, so that the shorter the time distance between the detection of the individual tire pressure measured values and their communication to evaluating electronics, the higher the safety to be able to recognize a dangerous change of the tire pressure sufficiently early, applies.

The main power consumption in such a tire pressure sensor arrangement is above all determined by the associated transmitting unit serving for the transmission of the individual tire pressure measured values to a distant terminal, i.e. to the receiving unit associated with vehicle electronics, which takes over the further processing of the communicated tire pressure or tire temperature values. In the previously customary tire pressure sensor arrangements, the measuring frequency of occurrence for the detection of the tire pressure measured values and the transmission frequency of occurrence for the communication of the tire pressure measured values are made independently of the driving state of the vehicle sensed via an additional acceleration sensor or an additional movement switch.

In the tire pressure sensor arrangements known in the prior art it is also required, in order to sense pressure changes of the tire pressure indicating damage of the tire as early as possible, to make a substantially continuous measurement of the pressure and temperature values in the tire depending on the sensed driving state of the vehicle and to transmit it to a central processing unit associated with vehicle electronics via a high-frequency radio link. The relatively high switch-on frequency of the transmitting unit in tire pressure sensor arrangements known in the prior art thus leads to a relatively high mean power consumption of the battery-operated arrangement, which results, as it is known, in the fact that the intended life of for example ten years of such tire pressure sensor arrangements cannot be achieved.

SUMMARY OF THE INVENTION

Starting from this prior art, it is the object of the present invention to provide an improved concept for monitoring tire pressure in a tire of a vehicle, so that over the entire intended life of a tire pressure sensor arrangement the physical state quantities, such as pressure and temperature in a tire, may be monitored reliably.

In accordance with a first aspect, the present invention provides a method of monitoring tire pressure of a tire of a vehicle, in which temporally successive tire pressure measured values are sensed by a pressure detector, and at least part of the tire pressure measured values is transmitted from a transmitter to a receiver with a variable frequency of occurrence, wherein the frequency of occurrence is derived from the sensed tire pressure measured values, by decrementing or incrementing a count of counter beginning with a starting value; comparing the count with a tire pressure change dependent parameter derived from the sensed tire pressure measured values; and triggering a transmission when the count reaches the tire pressure change dependent parameter.

In accordance with a second aspect, the present invention provides a method of monitoring tire pressure in a tire of a vehicle, wherein tire pressure measured values are sensed by a pressure detector at successive measuring time instants, and the tire pressure measured values are transmitted from a transmitter to a receiver at successive transmission time instants, wherein the distance between successive measuring time instants and/or the distance between successive transmission time instants is adjustable and is derived from the sensed tire pressure measured values, with the steps of: sensing a plurality of tire pressure measured values; ascertaining an instantaneous pressure dynamics state in the tire occurring as a result of the instantaneous driving situation of the vehicle from the plurality of tire pressure measured values, with the following substeps: evaluating a plurality of successive tire pressure measured values to obtain a tire pressure dependent driving situation parameter; comparing the tire pressure dependent driving situation parameter with a comparison parameter; and ascertaining the instantaneous pressure dynamics state from the comparison; adjusting the measuring time instants or the transmission time instants corresponding to the ascertained instantaneous pressure dynamics state.

In accordance with a third aspect, the present invention provides a computer program with a program code for performing, when the computer program is executed on a computer, the method of monitoring the tire pressure in a vehicle tire, in which temporally successive tire pressure measured values are sensed by a pressure detector, and at least part of the tire pressure measured values is transmitted from a transmitter to a receiver with a variable frequency of occurrence, wherein the frequency of occurrence is derived from the sensed tire pressure measured values, by decrementing or incrementing a count of counter beginning with a starting value; comparing the count with a tire pressure change dependent parameter derived from the sensed tire pressure measured values; and triggering a transmission when the count reaches the tire pressure change dependent parameter.

In accordance with a fourth aspect, the present invention provides a computer program with a program code for performing, when the computer program is executed on a computer, the method of monitoring tire pressure in a tire of a vehicle, wherein tire pressure measured values are sensed by a pressure detector at successive measuring time instants, and the tire pressure measured values are transmitted from a transmitter to a receiver at successive transmission time instants, wherein the distance between successive measuring time instants and/or the distance between successive transmission time instants is adjustable and is derived from the sensed tire pressure measured values, with the steps of: sensing a plurality of tire pressure measured values; ascertaining an instantaneous pressure dynamics state in the tire occurring as a result of the instantaneous driving situation of the vehicle from the plurality of tire pressure measured values, with the following substeps: evaluating a plurality of successive tire pressure measured values to obtain a tire pressure dependent driving situation parameter; comparing the tire pressure dependent driving situation parameter with a comparison parameter; and ascertaining the instantaneous pressure dynamics state from the comparison; adjusting the measuring time instants or the transmission time instants corresponding to the ascertained instantaneous pressure dynamics state.

In accordance with a fifth aspect, the present invention provides an apparatus for monitoring tire pressure in a tire of a vehicle, having: a pressure detector for detecting temporally successive tire pressure measured values, a transmitter for transmitting at least part of the tire pressure measured values to a receiver, a controller for controlling the frequency of occurrence of the transmission of the tire pressure measured values by the transmitter depending on the sensed tire pressure measured values, wherein the controller further has: a counter whose count is decrementable or incrementable beginning with a starting value; a comparator for comparing the count with a tire pressure change dependent parameter derived from the sensed tire pressure measured values; and a trigger for triggering a transmission by the transmitter when the count reaches the tire pressure change dependent parameter.

In accordance with a sixth aspect, the present invention provides an apparatus for monitoring tire pressure in a tire of a vehicle, wherein tire pressure measured values are detectable by a pressure detector at successive measuring time instants, and the tire pressure measured values are transmissible from a transmitter to a receiver at successive transmission time instants, wherein the distance between successive measuring time instants and/or the distance between successive transmission time instants is adjustable and derivable from the sensed tire pressure measured values, having: a tire pressure detector for detecting a plurality of tire pressure measured values; a transmitter for transmitting the tire pressure measured values to a receiver; a first controller for ascertaining an instantaneous pressure dynamics state in the tire occurring as a result of the instantaneous driving situation from the plurality of tire pressure measured values, further having: an evaluator for evaluating a plurality of successive tire pressure measured values to obtain a tire pressure dependent driving situation parameter; a comparator for comparing the tire pressure dependent driving situation parameter with a comparison parameter; and a second controller for ascertaining the instantaneous pressure dynamics state from the comparison, an adjuster for adjusting the measuring time instants or the transmitting time instants according to the ascertained instantaneous pressure dynamics state.

In the inventive method of monitoring the tire pressure in a tire of a vehicle, temporally successive tire pressure measured values are sensed by pressure measuring means, wherein at least part of the tire pressure measured values are transmitted from a transmitting unit to a receiving unit with variable frequency of occurrence. The frequency of occurrence of the transmission is derived from the sensed tire pressure measured values, or a tire pressure change of the tire is ascertained from a plurality of tire pressure measured values, wherein the temporal distance between successive detection time instants of the tire pressure measured values is adjusted depending on the ascertained tire pressure change of the tire.

The inventive apparatus for monitoring tire pressure in the tire of a vehicle includes pressure measuring means for sensing temporally successive tire pressure measured values, a transmitting unit for transmitting at least parts of the tire pressure measured values to a receiving unit, and a control unit for controlling the frequency of the transmission of the tire pressure measured values by the transmitting unit depending on the sensed tire pressure measured values or for ascertaining tire pressure change of the tire from a plurality of preceding tire pressure measured values, in order to adjust the temporal distance between successive detection time instants of the tire pressure measured values depending on the ascertained tire pressure change.

The present invention is based on the finding that the frequency with which currently sensed tire pressure measured values and optionally also other evaluated tire data are communicated by a transmitting unit to an external receiving unit is variable, wherein the frequency for the transmission is derived from the sensed tire pressure measured values themselves.

Not all sensed measured values are transmitted from the transmitting unit to the receiving unit as long as the sensed tire pressure measured values are in a normal region, wherein the frequency for the transmission of the tire pressure measured values is increased, i.e. relatively short temporal distances are chosen for the transmission of the tire pressure measured values, when a tire pressure dependent parameter derived from the sensed tire pressure measured values indicates increased tire pressure change or increased tire pressure changes. Increased tire pressure changes for example result from gas loss in the tire or an abnormal deformation or damage of the tire, wherein it is ensured that in this case changes of the tire pressure are recognized as quickly as possible by the increased frequency of the transmission of the current tire pressure measured values, and thus reliable monitoring of the functionality of the vehicle tire is enabled.

In the present invention, the time distance for the transmission of the tire pressure measured values, i.e. the frequency of the transmission of current tire pressure measured values, to a receiving unit is derived from the sensed tire pressure measured values so that on the one hand the ascertainment of a pressure change in the vehicle tire may be recognized and communicated to a receiving unit as quickly as possible, and on the other hand, due to the strongly decreased power consumption of the tire pressure sensor arrangement during the normal operation of the vehicle tire, it may be operated over the entire intended life, e.g. several years, with one battery.

In the present invention, the frequency with which temporally successive tire pressure measured values are transmitted by a transmitting unit to an external receiving unit is derived from the sensed tire pressure measured values themselves by a tire pressure dependent parameter being generated from the sensed tire pressure measured values, which is used for the assessment of the change of certain physical state quantities of the tire, such as tire pressure and tire temperature. The tire pressure dependent parameter may be a physical quantity ascertained from the tire pressure measured values, such as the tire pressure course or the temporal change of the tire pressure course (gradient), or the tire pressure dependent parameter may be a statistical quantity determined from the temporally successive tire pressure measured values.

By the evaluation of the tire pressure dependent parameter, the time distance for the transmission of the tire pressure measured values from the tire pressure sensor means, i.e. from the transmitting unit to the receiving unit connected to vehicle electronics, may be adjusted from the respective driving state of the vehicle and the respective state of the tire, wherein, in the non-operated state of the vehicle and thus in the tire, a maximum time period between the transmission of the tire pressure measured values results, which however constantly shortens, the greater the pressure changes in the vehicle become, which are reflected by the tire pressure dependent parameter and which result due to the drive at different speeds on different roadways. In case of damage of the tire, i.e. due to a pressure loss or a deformation of the tire indicating damage of the tire, the current tire pressure measurement results are communicated with a minimum time period between the individual transmissions.

An inventive embodiment of the method of adjustment of the frequency of the transmission of the sensed tire pressure values consists in sensing the temporal change or rate of change of the pressure course in the vehicle tire, wherein the rate of change of the pressure course is designated as the pressure dynamics state in a vehicle tire in the following. High rates of change of the pressure course thus lead to an increased pressure dynamics state, whereas low rates of change of the pressure course correspondingly lead to a low pressure dynamics state in the vehicle tire. According to the invention, the instantaneous pressure dynamics states are categorized into different classes, wherein the different classes or classifications of the pressure dynamics states describe different changes of the pressure courses in the vehicle tire, i.e. changes of the sensed tire pressure measured values with lower or with higher dynamics. Due to this classification, according to the invention, the distance between successive transmissions of the measured tire pressure measured values is fixed, wherein in case of low pressure change dynamics in the vehicle tire relatively long temporal distances, e.g. 20 minutes, and in case of high pressure change dynamics relatively short temporal distances, e.g. 20 seconds, between successive transmissions of the measured instantaneous tire pressure measured values are adjusted.

The inventive concept takes advantage of the fact that in the driving operation of a vehicle dynamic load redistributions result, which lead to a typical change of the gas pressure, i.e. to pressure dynamics states that can be evaluated, in one or more tires of the vehicle. For example, in a bend the outer wheels are loaded more strongly, so that as a result the pressure in these tires increases, whereas the tire pressure in the tires of the relieved wheels on the inside of the bend decreases. Corresponding typical tire pressure changes between the wheels of the rear axle and the front axle of the vehicle occur when breaking or accelerating the vehicle. Further pressure changes suggesting driving operation of the vehicle for example occur when driving over uneven ground.

The pressure changes in the vehicle tires to be expected in the driving operation of the vehicle generally have specific dynamics of few seconds due to the duration of typical driving situations. Such tire pressure changes in the vehicle wheels are not to be expected in the standstill or parking state of the vehicle, since the tire pressure in an intact tire in this case only varies due to temperature changes, and thus much lower dynamics in a range of minutes or hours occur with reference to a tire pressure change.

According to the invention, the tire pressure changes or also other sensed tire state parameters are evaluated, and so-called pressure dynamics states are ascertained. The ascertained pressure dynamics states may now be categorized into different classes of pressure dynamics states reflecting the different driving situations of the vehicle, so that without an acceleration sensor or a differently embodied roll detector a statement or decision can be made in which driving situation, corresponding to an ascertained low or high pressure dynamics state, the vehicle presently is.

Depending on the ascertained pressure dynamics state or classification in a certain class for the pressure dynamics states, according to the invention, the temporal distance between the successive transmissions of the measured tire pressure measured values may now again be set.

In contrast to acceleration sensors known in the prior art, in which the centrifugal force directly depending on the wheel rotational speed and thus immediately on the velocity of the vehicle is measured at the vehicle wheel, it is to be noted with reference to the present invention that the quick dynamic tire pressure changes, which are evaluated according to the invention, generally also occur in the driving operation of the vehicle, but are not directly linked to the rotational speed of the vehicles but rather to the load conditions when driving in bends and when accelerating or breaking and to the roadway conditions. On an ideally smooth and straight roadway at constant speed and direction, the pressure in an ideal tire without profile and imbalance would not change. The embodiment of the inventive method of adjustment of the frequency of the transmission of the sensed tire pressure values consists in that a so called clustering or classification of the sensed tire pressure measured values into pressure dynamics states or categories is made.

A clear advantage is that a pressure loss in a parked car does not lead to a wrong ascertainment of a driving state of the vehicle but to an increased pressure dynamics state of the tire. The same applies for the pumping up of the tire at the gas station or the increase of the weight load when getting in or loading the car.

Additionally or alternatively to the suitable adjustment of the temporal distance between successive transmissions of the current tire pressure measurement results of a tire pressure sensor or other tire state parameters, it is also possible with the present invention to ascertain an instantaneous driving situation of the vehicle corresponding to the respective ascertained pressure dynamics state or the respective classification of the pressure dynamics state, wherein now, depending on the ascertained instantaneous driving situation of the vehicle, also the temporal distance $\Delta T_{meas}$ between successive detection time instants of the tire pressure measured values sensed by the tire pressure measuring means may be adjusted correspondingly. Preferably, in a classification for lower pressure dynamics states in the tire of the vehicle, the temporal distance between successive detection time instants is chosen longer than the temporal distance between successive detection time instants in a classification for higher pressure dynamics states in the tire of the vehicle. This provides further energy saving potential in the monitoring of a vehicle tire.

By the inventive concept for monitoring tire pressure in a tire of a vehicle, a series of advantages results.

With battery-operated tire pressure sensor arrangements the required measurements of the tire pressure may be guaranteed over the entire intended life, which may lie on the order of ten years, of a tire pressure sensor arrangement, because the tire pressure sensor arrangement is in a power saving operation, so that the power consumption of the arrangement is extremely low, as long as no critical change of the tire pressure occurs. When, however, a critical change of the tire pressure indicating a gas loss or damage of the tire occurs, a time distance as short as possible between the communicated current tire pressure measured values is used, in order to be able to recognize changes of the tire pressure in an extremely reliable manner and very quickly and to evaluate them, when this is required.

Since in the present invention also a tire pressure dependent parameter derived from the sensed tire pressure measured values is used, from which the physical state parameters, i.e. the pressure in the tire depending on the driving state of the vehicle, may be inferred, in the present invention no additional acceleration sensor or movement switch, the evaluation of which on the one hand means additional expenditure in terms of circuit engineering and would thus on the other hand increase current consumption, i.e. the power consumption, of the tire pressure sensor arrangement, is required for the detection of the driving state of the vehicle.

In the present invention, it is also made possible that the current tire pressure measured values and optionally also other sensed and evaluated data are regularly transmitted to a central unit in the vehicle, e.g. the on-board computer, with a default minimum frequency, e.g. hourly, to enable the central unit to monitor the functionality of the tire pressure sensor arrangement. On the other hand, the present invention makes possible that pressure changes are communicated to the central unit extremely early so that damage of the tire can be recognized as early as possible.

Furthermore, the present invention makes possible that in addition to the current tire pressure measured value further information can be communicated to the central unit, which may then be sensibly evaluated, when the tire pressure is sensed in a constant time distance. This additional information is for example low-pass filtered pressure values or sliding averages of the sensed tire pressure measured values, the deviation of the measurement of the tire pressure measured value from the preceding value or a low-pass filtered or averaged value, or for example statistical values on the basis of the sensed tire pressure measured values, such as for example sample statistics for gradients or variances of the measured values over a certain observation period.

This additional data may be employed in an extremely useful manner for example in making an exact assessment of the tire state over a longer time period.

With reference to the inventive procedure for the classification of the ascertained pressure dynamics state in the vehicle tire and thus the ascertainment of the instantaneous driving situation of the vehicle from the sensed tire pressure measured values, a series of further advantages results with reference to the monitoring of tire pressure in a tire of a motor vehicle.

It is made possible that the power consumption of battery-operated tire pressure monitoring means may be further lowered to be able to perform the measurements of the tire pressure or other tire-specific parameters over the entire life of a tire monitoring system, wherein the tire monitoring system is for example arranged in the tire rim and is supposed to have a life on the order of several years.

According to the invention, this is now achieved by ascertaining a classification of the pressure dynamics states from a plurality of preceding tire pressure measured values, whereupon the temporal distance between successive detection time instants and/or transmission time instants of the tire pressure measured values is adjusted depending on the ascertained instantaneous driving situation. Thereby it is achieved that in driving situations with (relatively) low pressure dynamics states in the vehicle tires also a smaller number of measurements of the tire pressure values may be made, so that in this driving situation the energy consumption of the inventive tire monitoring arrangement may be further decreased.

Furthermore, it is made possible to be able to affect the time duration required by the tire pressure monitoring system until a change of state of the driving situation of the vehicle for example from a non-operated state into a driving state is recognized by the frequency of the tire pressure measurements, i.e. by the suitable adjustment of the temporal distance between successive detection time instants.

The present invention makes possible that the transmission time instant of a measured tire pressure measured value is fixed by the ascertained pressure dynamics states in a vehicle tire, wherein, according to the invention, also the distance between successive transmission time instants of the measured tire pressure measured values and/or the distance between successive detection time instants of the tire pressure measured values may be fixed by suitable classification of the ascertained pressure dynamics states.

BRIEF DESCRIPTION OF THE DRAWINGS

These and other objects and features of the present invention will become clear from the following description taken in conjunction with the accompanying drawings, in which:

FIG. 1 is a flow chart for a method of monitoring tire pressure in a tire of a vehicle according to the present invention;

DESCRIPTION OF THE PREFERRED EMBODIMENTS

Figure 2A:
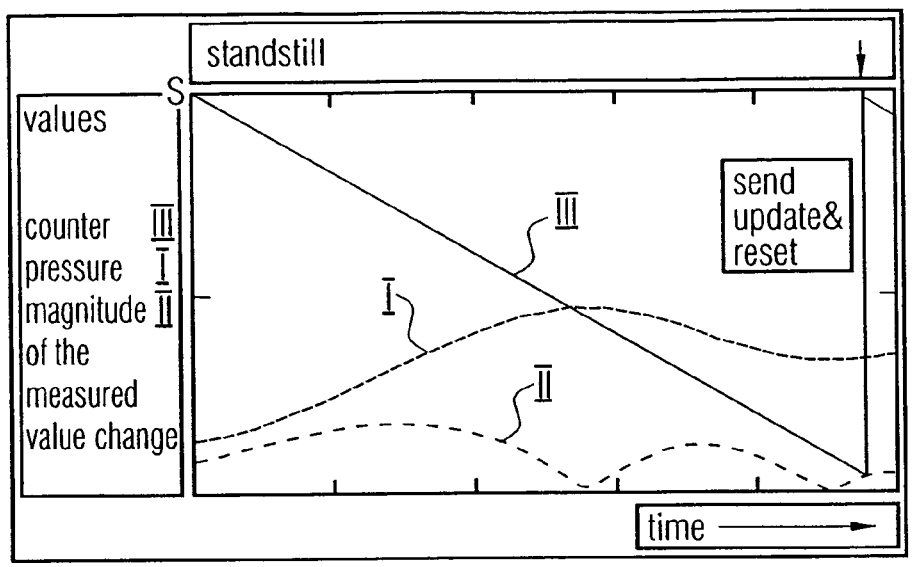
FIGS. 2a–c show, in diagram form, the procedure for the ascertainment of the frequency of the transmission of the tire pressure measured values from a transmitting unit to a receiving unit depending on the tire pressure and the magnitude of the measured value change according to the present invention.

With reference to FIG. 1, now a preferred embodiment of the present invention for the monitoring of tire pressure in a vehicle tire will be discussed on the basis of a flow chart.

As shown in box 12 of the flow chart 10 of FIG. 1, the method of monitoring tire pressure in a vehicle tire begins with sensing temporally successive tire pressure measured values. Furthermore, as shown in boxes 14 and 16 of flow chart 10, in addition optionally the temperature of the tire or the gas temperature in the tire and the battery state, i.e. the battery voltage are sensed. The values are then provided along with the current tire pressure measured value as temperature measured value and battery voltage measured value, as this is illustrated in boxes 18 and 20 of flow chart 10. After the physical state quantities of the vehicle tire have been sensed and the battery voltage has been ascertained, the power supply for the measuring means is switched off, as this is illustrated in box 22 (power down analog).

The ascertained physical state quantities are now made available to a control and evaluation unit for further processing, as this is illustrated by box 23 including boxes 24–38 of flow chart 10.

As illustrated in box 24 of FIG. 1, in the next procedural step the threshold value counter is decremented, this step being performed with each pass of the method. The preferred embodiment of this threshold value counter is for example an IIR (infinite impulse response) digital filter in which the decrement is calculated as fraction (0<b<1) of the current value. The coefficients a, b here represent the filter coefficients.

In a first embodiment, the IIR digital filter is a 1st order low-pass filter. Therefrom the following transfer function of the filter results:

$$H_{1IR}(z) = \frac{a}{1 - b \cdot z^{-1}}$$

In a second possible embodiment, the IIR digital filter is a 2nd order low-pass filter. Therefrom the following transfer function of the filter results:

$$H_{1IR}(z) = \left(\frac{a}{1 - b \cdot z^{-1}}\right)^2$$

The optional use of a 2nd order low-pass filter causes an even greater differentiation of the time distances of the wakeups calculated by the method. For this, this embodiment, however, requires a more expensive hardware arrangement.

In box 26 of FIG. 1, it is illustrated as next step that a filter is used to calculate an average of the three measured quantities pressure, temperature and battery voltage. This averaging is required for the subsequent calculation of the deviation of the current measured value. Moreover, by this filtering an increase of measuring accuracy may be achieved, because the low-pass filter attenuates the noise portion contained in the single values.

The embodiment of the filter used in this step is preferably identical with the IIR digital filter from box 24, because in this case the same hardware arrangement may be used. The coefficients a and b of the filter, however, have to be chosen differently and are in this case for example to be laid out in a programmable manner via a serial interface.

In the procedural step illustrated in box 28, now the difference between the current sample and the filtered value obtained in the procedural step of box 26 is calculated.

In the procedural step illustrated in box 30, the current measured value and the newly calculated average are stored. The stored values may be read out from the memory for example via a serial interface.

In the procedural step illustrated in box 32, the difference calculated in the procedural step illustrated in box 28 is squared and then low-pass filtered. The result of this filtering serves as an approximation value for the standard deviation. Preferably for reasons of multiple hardware usage, again the same filter as in the procedural steps illustrated in box 24 and box 26 is used as preferred embodiment, wherein the filter coefficients a and b are again laid out in a programmable manner via a serial interface.

In the procedural step illustrated in box 34, now a security query is executed to avoid that the counter overflows. If this is determined, a wakeup is triggered and the counter is reset to its initial value.

In the procedural step illustrated in box 36, it is now checked for whether the counter (see box 24) falls short of the approximation value of the standard deviation (see box 32). If required, a wakeup is triggered, and the counter is reset to its initial value.

In the procedural step illustrated in box 38, it is now checked for whether the current measured value is greater than a multiple of the approximated standard deviation. If required, a wakeup is triggered, and the counter is reset to its initial value. This second query guarantees an immediate reaction to great changes of the measured value. The chosen multiplicity of the approximated standard deviation is again programmable via a serial interface.

As illustrated in box 40 of flow chart 10, when the value of the tire pressure change dependent parameter reaches a default threshold, now the current tire pressure measured value corresponding to this time instant is provided.

As illustrated in box 43 of flow chart 10, optionally a temperature compensation of the sensed tire pressure measurement value may be performed. As illustrated in box 43a, for example a so-called compensated temperature may be calculated. The compensated temperature is preferably calculated, because the temperature sensor used is generally subject to fabrication variations leading to exemplar scatterings. For this, an additive coefficient is added to the current measured value for offset correction, and then a multiplicative coefficient is used for sensitivity correction. After correction with these two coefficients, each temperature sensor provides the same measured value in the scope of the intended equalization accuracy.

As illustrated in box 43b, for example also so-called temperature-compensated pressure coefficients may be calculated. This calculation is performed, because also the pressure sensor, like the temperature sensor (see box 43a), is generally subject to fabrication variations leading to exemplar scattering. In the pressure sensor, a clear dependence of the parameters on the temperature adds. In order to again achieve reproducibility of the pressure measurement, the current measured value is corrected according to a square polynomial. In order to additionally remove the temperature dependence, the three coefficients, offset, linear sensitivity correction, square sensitivity correction, are each corrected with a temperature correction factor depending on the temperature previously calculated, before the polynomial is calculated.

Furthermore, as illustrated in box 43c, compensated, such as temperature-compensated, tire pressure measured values may be calculated.

After the tire pressure change dependent parameter has reached a default threshold value, the corresponding current tire pressure measured value is communicated from transmitting means of the tire pressure sensor arrangement to a receiving unit associated for example with the central unit of vehicle electronics, as illustrated in box 42 of flow chart 10 by the activation of a µprocessor (µC) or the transmitting unit (transmitter).

As illustrated in boxes 44 and 46 of flow chart 10, a serial periphery interface is activated or is active, which is switched off after the transmission of the tire pressure measured value from a main unit (power down from master). Next, the counter is reset to its initial value, e.g. to zero "0", as illustrated in box 48 of flow chart 10. Thereupon the timer is reset, box 50, whereupon the digital circuit area of the tire pressure sensor arrangement is switched off, as this is illustrated in box 52 of flow chart 10.

As illustrated in box 54 of flow chart 10, now the timer is incremented, and the wakeup time for the analog and digital circuit is defaulted, see box 56 and 60, wherein again the serial periphery interface is activated, see box 62.

With the activation of the analog and digital circuit components of the tire pressure sensor arrangement, now again the detection of a subsequent tire pressure measured value begins, as this is illustrated in box 12 of flow chart 10.

In the following, on the basis of the diagrams illustrated in FIGS. 2a–c, it is explained how the inventive method of monitoring tire pressure in a vehicle tire is performed.

In FIG. 2a the tire pressure, i.e. the course of the sensed tire pressure measured values, in the vehicle tire is illustrated as course I versus time. The course II now shows the change of the course of the tire pressure in the vehicle tire, i.e. the gradient. The course III shows the count of a counter, which is decremented by a fixed value each, beginning with a starting value "S", so that the threshold for the triggering of a transmission of a tire pressure measured value decreases depending on the count.

As illustrated in FIG. 2a, then the transmission of a sensed tire pressure measured value is triggered, when the count illustrating the threshold value for the triggering of a transmission reaches the course for the magnitude of the measured value change, i.e. the course of the tire pressure change dependent parameter.

Figure 2B:
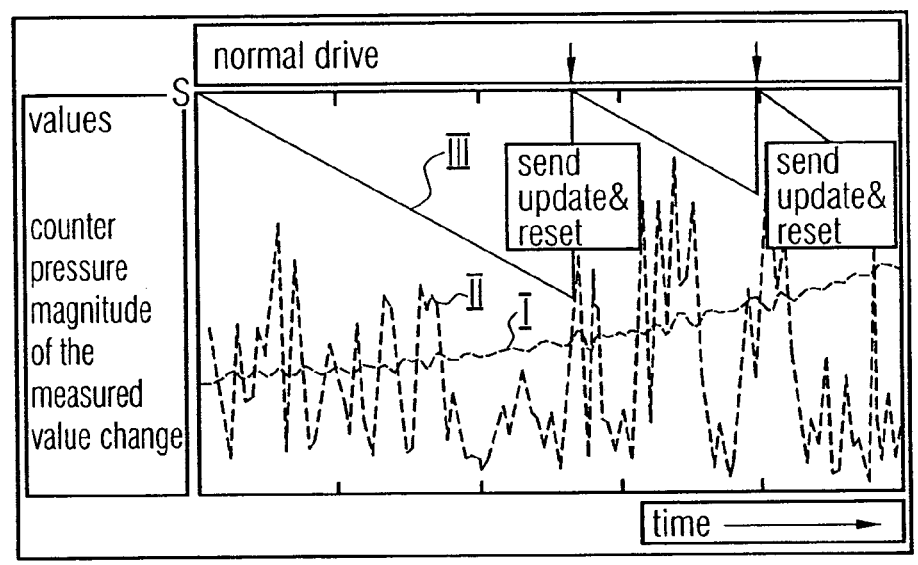
Figure 2C:
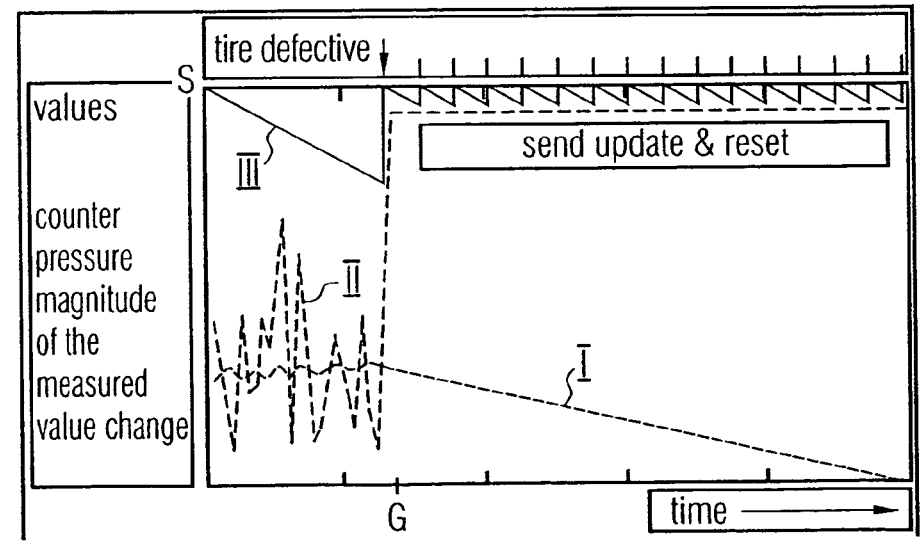

It is to be noted that in FIGS. 2a–c the magnitude of the measured value change of the tire pressure has only exemplarily been chosen as the tire pressure change dependent parameter, wherein an arbitrary tire pressure change dependent parameter may be used, which is determined from the sensed tire pressure measured values in order to be compared with the count to trigger the transmission of the tire pressure measured value, when the count reaches or falls short of this tire pressure change dependent parameter.

The diagram illustrated in FIG. 2b now shows the course of the sensed tire pressure measured values during the drive of a motor vehicle as course I, wherein here also a change of the tire pressure by the deformation of the tire when driving in bends or by driving over uneven ground is superimposed on the temperature-induced change of the tire pressure. The course II again represents the magnitude of the measured value change of the tire pressure measured values. It should be appreciated that this course II shows relatively large variations.

The course III again represents the count of the counter, which is decremented beginning with a starting value S. The count is again compared with the tire pressure change dependent parameter derived from the sensed tire pressure measured values, wherein the transmission of the tire pressure measured value is again triggered when the count reaches or falls short of the tire pressure change dependent parameter.

As illustrated in FIG. 2a, since the tire pressure of for example a parking vehicle only slowly changes contingent on the change of the ambient temperature, a very low transmission rate of the sensed tire pressure measured value results, i.e. the tire pressure measured values are transmitted from the transmitting unit of the tire pressure sensor arrangement to a receiving unit with a very low frequency of occurrence.

Since the course II of the magnitude of the measured value changes has very strong variations, in this case a transmission of the tire pressure measured value is triggered significantly earlier than in the diagram illustrated in FIG. 2a, because the count reaches or falls short of the tire pressure change dependent parameter significantly earlier. Due to the relatively great variations of the course II of the magnitude of the measured value change, the system now reacts with an increased transmission rate.

In FIG. 2c it is now illustrated in form of a diagram how the course I of the tire pressure, the course II of the magnitude of the measured value change, and the count III change, when continuous pressure loss in the vehicle tire, for example due to damage of the tire, occurs.

Due to the continuous pressure loss in the vehicle tire, the tire pressure continuously falls from the time instant G. From this time instant on, the magnitude measured value change II rises to a maximum value extremely quickly, whereby after the occurrence of the pressure loss in the tire for example each time a new tire pressure measured value is sensed, the transmission of the sensed tire pressure measured value is triggered.

The inventive method of monitoring tire pressure in a vehicle tire illustrated in FIGS. 2a–c on basis of diagrams may thus be summarized as follows.

Sensor means is for example activated by a wakeup timer in regular intervals, e.g. a second, to make a detection of the current tire pressure measured value. With each measurement made, a counter is decremented beginning with the starting value S. From the temporally successive tire pressure measured values (course I), a tire pressure change dependent parameter (course II) is derived, such as the gradient (the change) of the pressure course, wherein this parameter is compared with the count. If the count, which continuously decrements, now reaches the tire pressure change dependent parameter, a transmission of the current tire pressure measured value is made, i.e. a transmitting unit is activated to transmit the current tire pressure measured value to a receiving unit. Then the counter is again reset to the starting value S, and the tire pressure monitoring cycle begins again.

Corresponding to a further possible embodiment of the inventive method of monitoring tire pressure in a vehicle tire, it is of course also possible that the derived tire pressure change dependent parameter is added to the count, wherein the counter is reset to an initial value S, e.g. to zero "0", after each triggering of a transmission and incremented (increased) after each detection of a tire pressure measured value. The transmission of a current tire pressure measured value is then triggered in this embodiment, when the sum of the tire pressure change dependent parameter and the count of the counter exceeds a default fixed threshold.

A further possibility to combine the count of the counter with the tire pressure change dependent parameter also consists in multiplying both values, i.e. the count and the parameter. The advantage of a multiplication of the count by the tire pressure change dependent parameter consists in that thereby strong dynamics of the course resulting from the multiplication is generated, so that higher resolution in the monitoring of the tire pressure in a vehicle tire is achievable.

Furthermore, it should be noted that the tire pressure change dependent parameter derived from the sensed tire pressure measured values, which is compared with the respective count, may also consist of statistical values by means of which the frequency of occurrence of the transmission of the current tire pressure measured value to a receiving unit may be derived.

The tire pressure change dependent parameter may for example be the difference of two successive sensed tire pressure measured values. The tire pressure change dependent parameter may further be the square of the difference of two successive tire pressure measured values. As tire pressure change dependent parameter, also the difference of the sensed tire pressure measured value to a low-pass filtered or averaged value of the temporally successive sensed tire pressure measured values may be used. As the tire pressure change dependent parameter, also the square of the difference of a sensed tire pressure measured value to a low-pass filtered or averaged value of a plurality of temporally successive, sensed tire pressure measured values may be used.

As tire pressure change dependent parameter, also the standard deviation of a plurality of past temporally successive sensed tire pressure measured values may be used. As the tire pressure change dependent parameter, moreover an averaged or filtered value of the previously named tire pressure change dependent parameters may be used.

Furthermore, it is to be noted that in the inventive method of monitoring tire pressure in a vehicle tire, instead of the exceeding of a count also the exceeding of a statistical measured quantity, such as a multiple of the standard deviation of the last sensed tire pressure measured values lying in the past, or another measured quantity, such as the variance of the past tire pressure measured values, may also be used, wherein these values may also be averaged or filtered again.

Furthermore, it is possible to process these values with a counter. The processing of the statistical measured quantity with a count may for example be such that the statistical quantity is chosen as counter decrement. This variant enables stronger differentiation of the transmission intervals, because not only the intersection between counter and threshold value lies higher, but also the count is decremented more quickly.

In the following, it is now discussed on the basis of the diagrams illustrated in FIGS. 3a–b how the frequency of the transmission of current tire pressure measured values to a receiving unit is determined in a further embodiment of the inventive method of monitoring tire pressure in a vehicle tire.

Figure 3A:
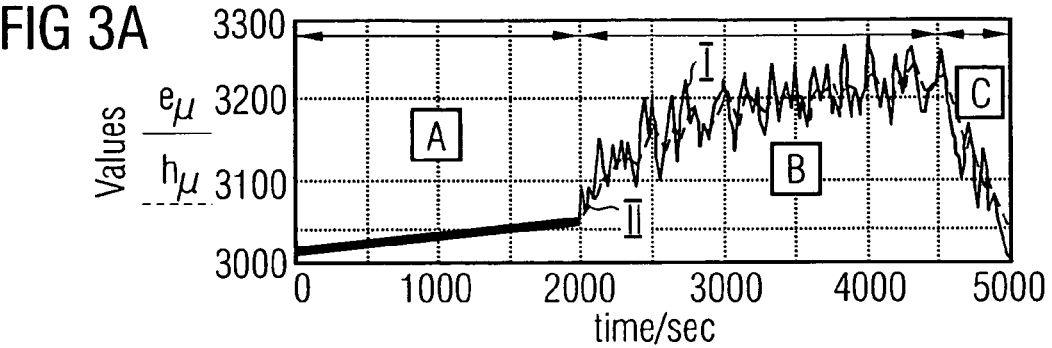
FIG. 3a and 3b show, in diagram form, the procedure for the ascertainment of the frequency of the transmission of the tire pressure measured values depending on a statistical quantity (standard deviation) obtained from the pressure course according to the present invention.

The course I in FIG. 3a shows the course of the sensed tire pressure measured values in various vehicle states A–C, wherein the course II illustrates the averaged or low-pass filtered course of the sensed tire pressure measured values. The area A in the diagram of FIG. 3a describes the course of the tire pressure in a vehicle for example parking in the sun, wherein the tire pressure of the vehicle tire only changes slowly contingent on the small change of the ambient temperature. The area B represents the course of the tire pressure measured values in the vehicle tire during the drive, wherein a pressure change by the deformation of the tire when driving in bends or by driving over uneven ground is also superimposed on the temperature-induced pressure change. The area C represents a continuous pressure loss in the vehicle tire for example due to damage of the tire.

Figure 3B:
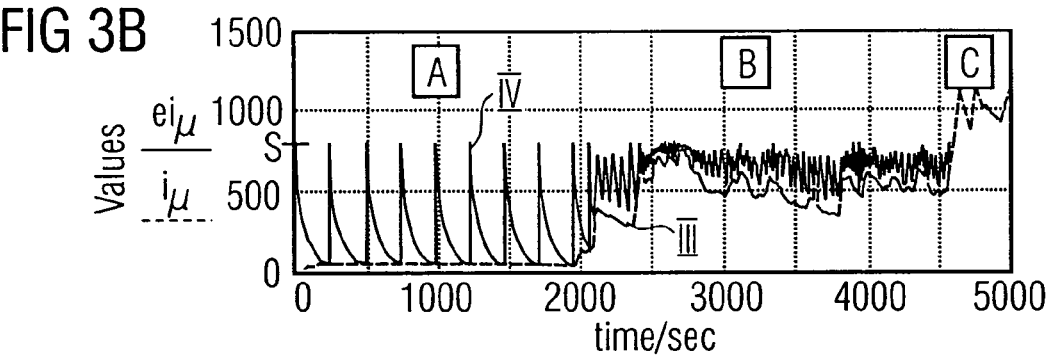

In the diagram illustrated in FIG. 3b, the course III represents the standard deviation of the temporally successive, sensed tire pressure measured values, wherein by standard deviation of measured values the average deviation of the sensed measured values from the average of the measured values is understood. The course III, i.e. the standard deviation of the sensed tire pressure measured values, thus represents the tire pressure change dependent parameter derived from the sensed tire pressure measured values in the case illustrated in FIG. 3b.

The course IV in FIG. 3b represents the count of a counter, which is decremented beginning with a starting value, wherein in the present case the counter does not count in a linear manner, but the decrement changes depending on the count. This is achieved by weighting the counter by the application of a nonlinear function. A nonlinear function may for example be generated by the step response or the pulse response of a digital filter, e.g. a IIR (infinite impulse response) filter.

This variant enables stronger differentiation of transmission intervals, because not only the intersection between counter and threshold value lies higher, but the count is additionally also decremented more quickly. This may for example be achieved by using the impulse response of an IIR digital filter, when the cut-off frequency of the filter is chosen proportionally to the statistical quantity.

In the following, the flow of the inventive method for monitoring the tire pressure in the vehicle tire will be explained on the basis of FIGS. 3a–b.

With each measurement of a tire pressure value that has taken place, the counter is decremented beginning with a starting value S, wherein the counter does count in a nonlinear manner in the present case. Therefrom results the exponentially falling course IV in FIG. 3b. If the value of the counter reaches the tire pressure change dependent parameter, i.e. the standard deviation of the course of the tire pressure, the transmitting unit is activated to communicate the current tire pressure measured value to the receiving unit. As can be seen from the diagram in FIG. 3b, in the area A simulating a vehicle parking in the sun, transmission of the tire pressure measured values is triggered with minimum frequency.

In the area D in which a pressure change by the deformation of the tire when driving in bends or driving over uneven ground is here superimposed on the temperature-induced pressure change the system reacts with a correspondingly increased transmission rate. In the area C representing a continuous pressure loss due to damage of the vehicle tire continuous data, i.e. tire pressure measured values, are communicated to the receiving unit.

Advantageous in the application of a nonlinear function by the counter, as illustrated in FIG. 3b, is that starting from the starting value the first decrements of the counter are relatively large, so that a high tire pressure change dependent parameter may be sensed quickly. But if a low tire pressure change dependent parameter is present, the intervals between the triggering of a transmission of a current tire pressure measured value may be expanded relatively long by the exponential course of the nonlinear function applied to the counter.

Figure 4A:
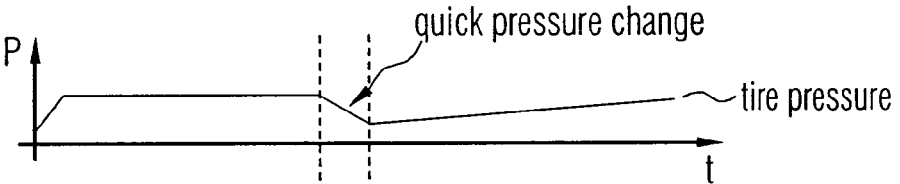
FIGS. 4a–b are a principle illustration of the change of the time distance for the transmission of the tire pressure measured values depending on the driving state of the vehicle and the tire state.
Figure 4B:
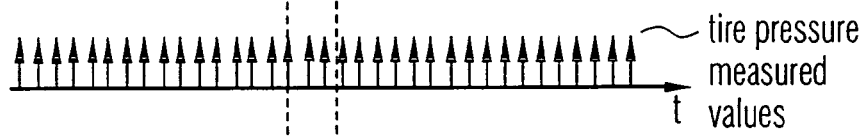
Figure 4C:

On the basis of FIGS. 4a–c, the change in principle of the time distance and thus the frequency of the transmission of temporally successive tire pressure measured values is now again illustrated in summarized form.

FIG. 4a shows the tire pressure versus time. In FIG. 4b the continuous detection of the temporally successive tire pressure measured values is illustrated. FIG. 4c now shows with which frequency the sensed current tire pressure measured values are transmitted to the receiving unit, wherein in the area of quick pressure change many current tire pressure measured values are transmitted, and wherein the smaller the tire pressure change, the fewer current tire pressure measured values are transmitted. In the non-operated state a maximum time period $\Delta T_{max}$ of transmission therebetween arises, which constantly shortens, the greater the pressure changes become, which result from the drive with different speed on different roadways, wherein the minimum time period $\Delta T_{min}$ between the transmissions results at a very quick pressure change for example by damage of the tire.

With the present invention it is also possible to process temperature values of the gas volume in the vehicle tire. For example, the quotient from a sensed tire pressure measured value and a temperature measured value may be processed. This is advantageous in so far as, assuming that the volume of the tire does not change significantly, in all pressure changes contingent on temperature changes this quotient should not change, wherein taking the "ideal gas law" into account, p*V/T=const. applies, wherein p is the tire pressure, V the tire volume, and T the temperature.

Thereby, pressure change caused by gas loss or deformation of the tire may be discriminated from a superimposed temperature-induced change. Therefrom especially the standstill of the car may be derived, wherein in this state the transmission frequency may be reduced in an especially drastic manner. Also considering the average of this quotient over a period of time, it should be almost constant, unless gas escapes from the tire. This again represents the most important state to be sensed for a tire pressure sensor. It is to be noted that temperature measurement, however, does not have to be performed each time, so that the time interval for temperature measurement may be extended against tire pressure measurement (e.g. at $\Delta T_{min}$~1s), e.g. 8s. The battery voltage measurement takes place in even longer time intervals, e.g. 64 seconds.

Furthermore, in the present invention, it should be noted that when the communication of a current tire pressure measured value is triggered, arbitrary physical parameters, such as temperature, battery voltage etc., and also statistical parameters, such as the standard distribution of the temperature course etc., may be communicated. Statistical parameters are also for example the difference of two successive measured values, a low-pass filtered pressure value or a pressure value averaged across the past samples, statistical quantities, such as the standard deviation or the average of the noise with reference to one of the previously mentioned averages or the quotient from pressure and temperature, which should be approximately constant in the non-operated state and on average. As it is known, the standard deviation is the average of the squared differences to the average. In connection with the present invention, the average of the non-squared absolute values of the above-mentioned difference is designated as average of the noise.

It should also be noted that in the inventive method of monitoring tire pressure in a vehicle tire it is also possible to sense the tire pressure measured values not only continuously, but that the time raster of the detection of the tire pressure measured values may for example also be derived from the sensed tire pressure measured values. Thereby a further decrease of the mean power consumption of the sensor arrangement for tire pressure monitoring results.

In the following, on the basis of FIGS. 5a–c and FIG. 6, the inventive procedure will be explained, in which an instantaneous pressure dynamics state in a tire of a motor vehicle may be ascertained and classified from a number of preceding tire pressure measured values, wherein the temporal distance $\Delta T_{send}$ between successive transmission time instants of the tire pressure measured values and/or also the temporal distance $\Delta T_{meas}$ between successive detection time instants of the tire pressure measured values is adjusted depending on the ascertained instantaneous pressure dynamics state or the classification of the ascertained pressure dynamics state.

The pressure dynamics state in the tire of the vehicle may be categorized into various classes of pressure dynamics states, which again reflect various driving situations of the vehicle, such as a non-operated state, e.g. standstill or parking, or one or more driving states of the vehicle, wherein the temporal distance $\Delta T_{send}$ between successive transmission time instants of the tire pressure measured values and/or also the temporal distance $\Delta T_{meas}$ between successive detection time instants of the tire pressure measured values is chosen longer by tire pressure measuring means during a driving situation with low pressure dynamics state in the tire of the vehicle than during a sensed high pressure dynamics state in the tire of the vehicle, to enable monitoring of the tire pressure and thus the tire state taking place in sufficiently short intervals during high pressure dynamics states in the tire of the vehicle.

The subdivision of the temporal distances $\Delta T_{send}$ between successive transmission time instants depending on the various ascertained instantaneous pressure dynamics states or the classification of the pressure dynamics states in a tire of a vehicle is done for example for security reasons, because in driving states with rising tire stresses and thus higher pressure dynamics states also more frequent checking of the tire pressure values should take place to be able to recognize and indicate to the driver damage, pressure loss etc. of the vehicle tire as early as possible.

With reference to the following description, it is to be noted that the temporal distance between successive transmission time instants of the tire pressure measured values in general, i.e. without reference to the pressure dynamics states, is designated with $\Delta T_{send}$, wherein the adjusted temporal distance with reference to a sensed, low pressure dynamics state (or no pressure dynamics) in the tire of the vehicle is designated with $\Delta T_{send1}$ and with reference to a sensed, higher pressure dynamics state in a tire of the vehicle with $\Delta T_{send2}$.

With reference to the following description, it should also be noted that the inventive concept presented may equally be applied to the suitable adjustment of the temporal distances $\Delta T_{meas}$ ($\Delta T_{meas1}$, $\Delta T_{meas2}$, . . . ) between successive detection time instants of the tire pressure measured values.

In the inventive procedure explained in detail following it is taken advantage of the fact that in the driving operation of a vehicle so-called "dynamic load redistributions" result, which lead to a change of the tire pressure in the vehicle tires, wherein high or low changes of the pressure course in a vehicle tire give rise to an increased or lower pressure dynamics state, respectively. When the vehicle is driven in a bend, for example, the outer vehicle wheels are loaded more strongly, so that consequently also the tire pressure in these vehicle tires increases, whereas the tire pressure in the vehicle tires of the relieved vehicle tires on the inside of the bend decreases. Comparable dynamic load redistributions in a vehicle also occur when breaking or accelerating the vehicle between the vehicle tires of the rear axle and the front axle. When breaking a vehicle, the vehicle tires of the front axle are usually more highly loaded, whereas when accelerating the vehicle, the driven axle(s) of the vehicle are more strongly loaded, and thus the tire pressure increases in these vehicle tires. Further tire pressure changes during the vehicle operation of a motor vehicle occur for example when driving over uneven ground.

The tire pressure changes in the vehicle tires to be expected during driving operation of the motor vehicle usually have pressure change dynamics of few seconds, i.e. a high pressure dynamics state contingent on the time duration of typical driving situations, like driving in bends, accelerating, etc. Such tire pressure changes, however, are not to be expected during the standstill or parking state of the vehicle, because the tire pressure in an intact vehicle tire here only varies due to temperature changes and thus shows far smaller change of the pressure dynamics states in a range of minutes or also hours.

In the following, it will be explained in detail how the tire pressure changes or pressure dynamics states in a vehicle tire occurring during certain driving situations of the vehicle may be evaluated and categorized into certain classes for the pressure dynamics states, so that without the use of an acceleration sensor or a different roll detector a decision can be made, in which driving situation the vehicle presently is.

Figure 6:
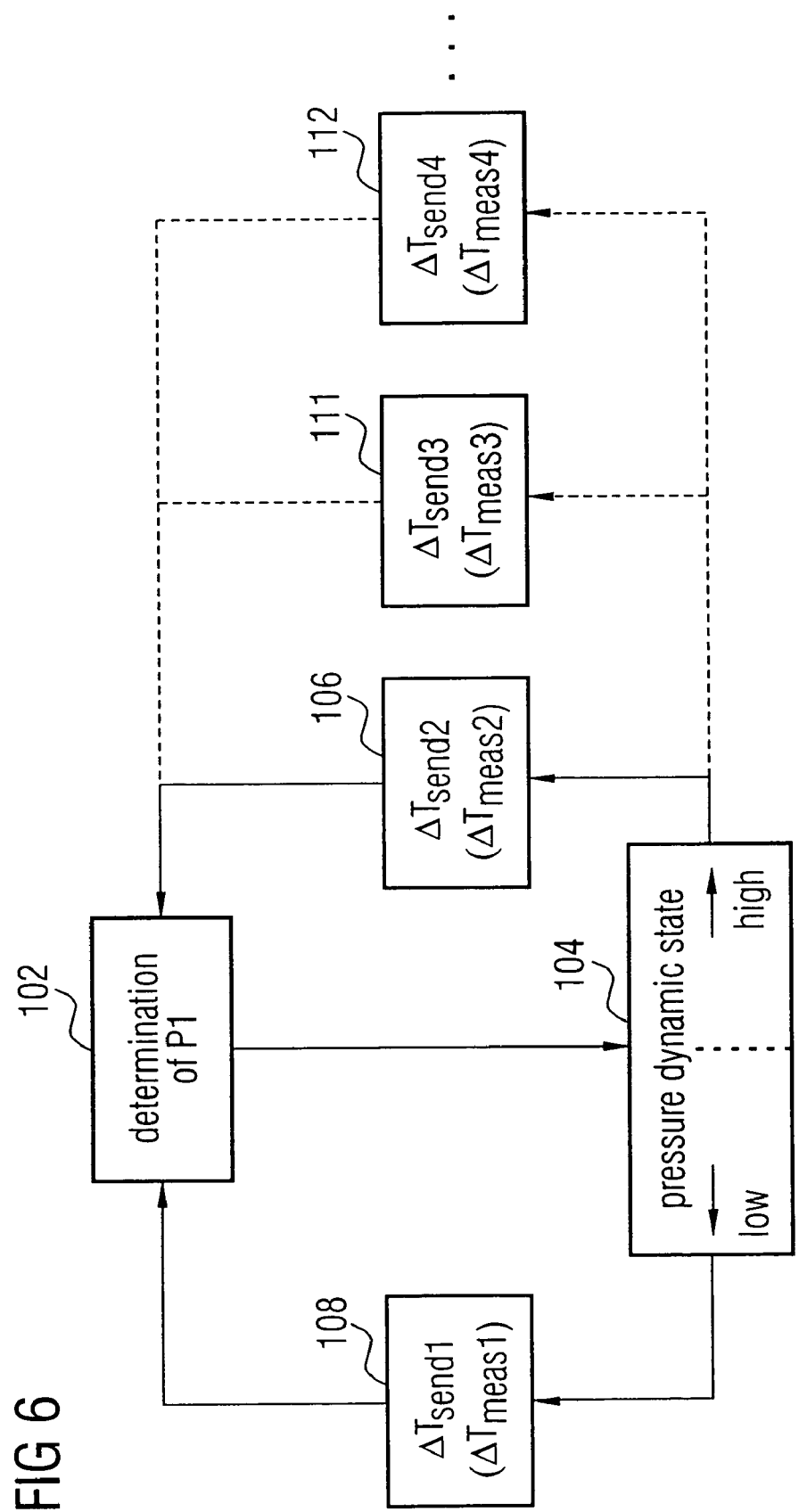
FIG. 6 is a flow chart with the various procedural steps for ascertaining and classifying pressure dynamics states in the tire of a vehicle according to the inventive method.

On the basis of the flow chart 100 illustrated in FIG. 6, now the inventive procedure for the ascertainment of the instantaneous driving situation of the vehicle is illustrated, in order to be able to adjust the temporal distance ($T_{send}$) between successive transmission time instants of the tire pressure measured values depending on the ascertained driving situation in the inventive method of monitoring tire pressure in a vehicle tire.

As already indicated above, it is further to be noted that the inventive concept present in the following may equally be applied to a suitable adjustment of the temporal distances $\Delta T_{meas}$ between successive detection time instants of the tire pressure measured values.

As illustrated in step 102 of flow chart 100, at first a tire pressure dependent driving situation parameter P1 is ascertained by evaluating a sensed tire pressure measured value or a plurality of successive tire pressure measured values.

To this end, the tire pressure in the vehicle tires is measured for example in time intervals $\Delta T_{meas}$, which are shorter or equal to the period of time intended for recognition of the transition of the vehicle between non-operated state and driving state. The measured times, i.e. the time intervals between successive detection time instants of the tire pressure measured values, according to the invention, may differ in the driving state of the vehicle from the sensed tire pressure measured values during the non-operated state of the vehicle, wherein, however, in general the preceding sensed driving situation of the vehicle is taken into account.

Figure 5A:
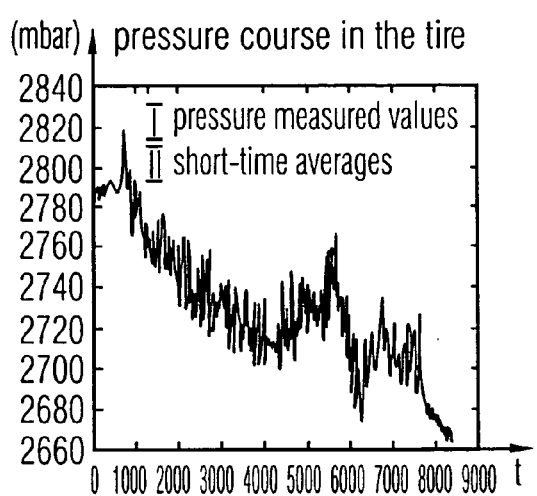
FIGS. 5a–c show, in diagram form, the procedure for the classification of the pressure dynamics states in a tire of a motor vehicle, with FIG. 5a illustrating an exemplary ascertained course of pressure measured values in the tire and their short time averages, FIG. 5b pressure variations, and FIG. 5c deviation squares of the pressure variations, filtered deviation squares, and the ascertained driving situation.

From the successive tire pressure measurements, now a so-called short-time average of the sensed tire pressure course is formed by filtering. FIG. 5a exemplarily shows an ascertained tire pressure course I in a vehicle tire versus time and the correspondingly ascertained short-time averages (course II in FIG. 5a) of the tire pressure course I.

In FIG. 5a, the tire pressure measured values have exemplarily been measured in a temporal distance $\Delta T_{meas}$ of 0.5 seconds, wherein in practice values for the temporal distance $\Delta T_{meas1}$ (in a low pressure dynamics state) are preferred for example in a range of 0.5 to 120 seconds and values for the temporal distance $\Delta T_{meas2}$ (in a higher pressure dynamics state) are preferred for example in a range of 0.1 to 5 seconds. The corresponding temporal distances for the communication time instants of the ascertained tire pressure measured values for example range from 15 to 120 minutes for low pressure dynamics states and from 5 to 60 seconds for high pressure dynamics states.

The short-time average, as it is illustrated in FIG. 5a, was exemplarily calculated with a 2nd order IIR filter having the following transfer function:

$$H_{11RI}(z) = \left(\frac{1-a}{1-a\cdot z^{-1}}\right)^2;$$

with the parameter a representing the constant determining the cut-off frequency of the 2nd order IIR filter.

The embodiment of the IIR filter used may for example be identical with the IIR digital filter from box 32 of FIG. 1, because in this case the same hardware arrangement may be used for the multiple usage of the IIR filter. A multiple usage could be of interest for the case when it is desired to dynamically design the decision on the transmitting time instants according to the method of FIG. 1, which offers the advantage of obtaining the correlation between pressure detection event and transmission time instant but nevertheless different measuring rates are to be used.

In the following, now at each tire pressure measured value the difference of the tire pressure measured values to the short-time average of the tire pressure measurement is determined, as this is exemplarily illustrated in FIG. 5b on the basis of the tire pressure variation as course III versus time. It should be noted that the short-time averaging may be made over an arbitrary number of previously sensed (preferably successive) tire pressure measured values, wherein on the other hand it is also possible to obtain the pressure difference directly from only two successive tire pressure measured values without forming a short-time average over several preceding tire pressure measured values.

Instead of the IIR low-pass filtering and difference formation between measured value and filtered value, which in the end represents a high-pass filtering for generating the difference values, also a band pass filtering may be employed, whereby not only, as in high pass, the low frequency pressure variations due to temperature changes but also signal portions that are too high frequent for driving movements may be filtered out.

Figure 5B:
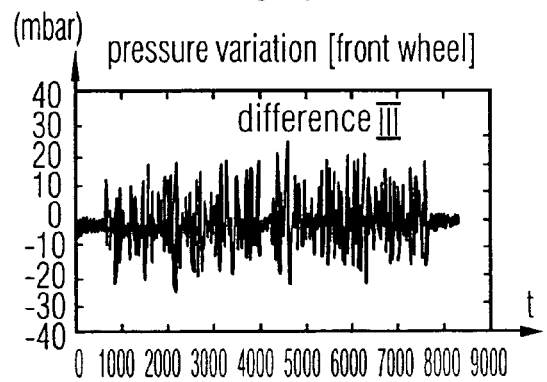
Figure 5C:
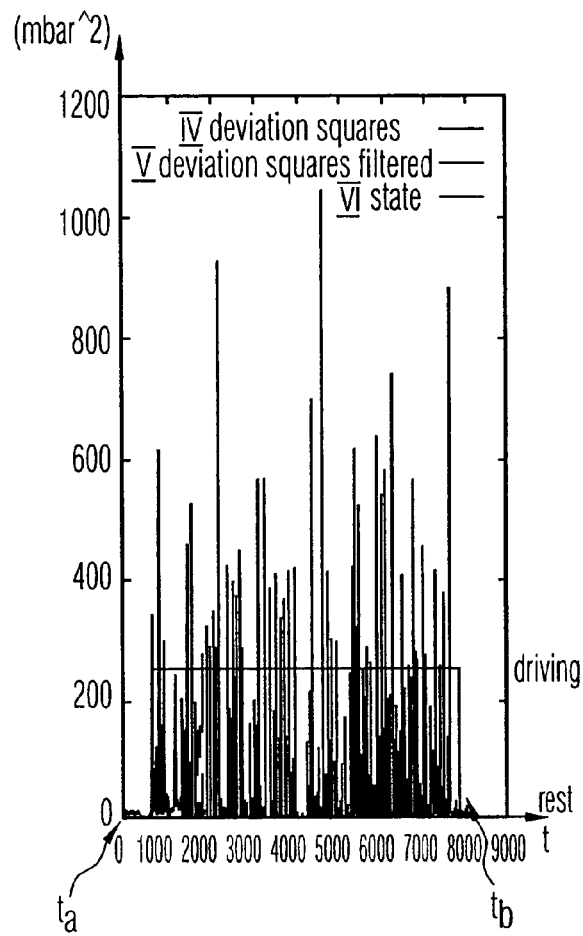

The difference values, as illustrated in FIG. 5b, now are for example squared to obtain the difference squares (deviation squares) of the tire pressure measured values illustrated as course IV in FIG. 5c. Instead of the difference square of the tire pressure measured values, also simply the difference magnitudes of the tire pressure measured values could be used or processed further in the following.

Thereupon the squares of the difference values of the tire pressure measured values are again filtered with an IIR filter to determine a short-time average of the deviation squares, which represents a preferred tire pressure dependent driving situation parameter P1 according to the inventive concept. Here, the IIR filter has the following transfer behavior:

$$H_{11R2}(z) = \left(\frac{1-b}{1-b\cdot z^{-1}}\right)^2$$

wherein the constant b determines the cut-off frequency of this filter. In FIG. 5c, the filtered deviation squares of the squared difference values of the pressure measured values are illustrated as course V in FIG. 5c.

In the procedural step illustrated by the reference numeral 104 in flow chart 100, now the tire pressure dependent function parameter P1 is compared with a comparison threshold or a comparison value PV1 to decide whether high or low pressure dynamics states are present in the vehicle tire, i.e. in which driving situation the vehicle is. This comparison parameter PV1 is ascertained for example via a plurality of past sensed tire pressure measured values.

Starting for example from a non-operated state of the vehicle, the tire pressure in the vehicle tires is preferably measured in time intervals $\Delta T_{meas}$, which are shorter than or equal to the period of time within which a transition of the vehicle between a non-operated state and a driving state is to be recognized.

Now it is changed from a classification for relatively low pressure dynamics states, which for example reflect a non-operated state of the vehicle, to a classification for relatively high pressure dynamics states, which for example reflect a driving state of the vehicle, if, within a default number (1, 2, 3, . . . ) of passed measurements of the tire pressure measured values, a default number (1, 2, 3, . . . ) of exceedings of the current tire pressure dependent function parameter P1, i.e. for example the current difference square of the tire pressure measured values, above the first comparison parameter PV1 occurs, wherein the first comparison parameter preferably is a default, integer multiple of the short-time average of the difference squares. Of course, also a non-integer multiple of the short-time average of the difference squares may be used.

In the simplest case, with as few as one exceeding of the first comparison parameter PV1 by the tire pressure dependent function parameter P1, thus a change of the classification of the pressure dynamics state in the vehicle tire may be made.

When changing from the classification for relatively low pressure dynamics states to the classification for relatively high pressure dynamics states, the tire pressure measured values are communicated with a decreased temporal distance $\Delta T_{send2}$ ($\Delta T_{send2} < \Delta T_{send1}$) between successive transmission time instants of the tire pressure measured values, as this is illustrated in flow chart 100 by box 106.

If now on the other hand, within a default number of measurements (1, 2, 3, . . . ), exactly one or a default number of under runs of the tire pressure dependent driving situation parameter P1, i.e. preferably the current difference square of the tire pressure variations, below another second comparison parameter PV2 occurs, wherein this is ascertained in step 104 of flow chart 100, it is changed from the classification for relatively high pressure dynamics states to the classification for relatively low pressure dynamics states. The second comparison parameter PV2 for example is a default integer fraction of the short-time average of the difference squares. Of course also a non-integer fraction of the short-time average of the difference squares may be used.

With reference to the adjustment of the temporal distances between successive transmission time instants of the tire pressure measured values this means that now the temporal distance $\Delta T_{send1}$ is used, as this is illustrated in box 108 of flow chart 100, to communicate the tire pressure measured values in greater temporal distances $\Delta T_{send1}$ between successive time instants.

With reference to the first and second comparison parameters, it should be noted that these may be chosen identically, so that for example a fixed comparison threshold, the falling short of or exceeding of which is assessed (in step 104), is taken as a basis to ascertain the instantaneous driving situation.

Now it is to be noted that the first comparison parameter PV1 may be limited by a maximum value $PV1_{max}$ of a tire pressure change, in order to thereby ensure that high pressure deviations, which are not plausible in the non-operated state of the vehicle, always lead to a change of the classification to a classification for high pressure dynamics states and thus a more frequent monitoring of the tire pressure. This is required because with a great number of successive high pressure deviations also the short-time average of the pressure deviations rises very high, so that the multiple of the short-time average forming the first comparison parameter PV1 is exceeded only very late (if at all). With this, it is to be ensured that with the exceeding of the maximum value $PV1_{max}$ of a tire pressure change the temporal distance between successive detection time instants of the tire pressure measured values is automatically decreased in order to guarantee the secure monitoring of the tire pressure measured values in short detection intervals.

Furthermore, it should be noted that the first comparison parameter PV1 for the assessment of the tire pressure dependent driving situation parameter P1 may also be limited by a minimum value $PV1_{min}$ in order to ensure that tire pressure deviations characterizing no unique classification of the pressure dynamics states do not lead to an unnecessary change of the classification to a classification for high pressure dynamics states and thus to an unnecessary load of the battery of the tire pressure monitoring system. The use of the minimum value $PV1_{min}$ for the first comparison parameter PV1 is preferably employed to ensure that after a great number of successive very small tire pressure changes a minimum change of the tire pressure, which may however be a multiple of the short-time average lowered by the preceding measured values with small change, does not already lead to an exceeding of an extremely low first comparison parameter PV1 and thus to a not required change of the classification to a classification for high pressure dynamics states (to a categorization in a driving state of the vehicle).

Furthermore, it should be noted that the second comparison parameter PV2 may be limited by a maximum value $PV2_{max}$ to ensure that after high pressure deviation values during a calmer driving state of the vehicle the classification is not wrongly changed to a classification for low pressure dynamics states.

Furthermore, preferably also a minimum value $PV2_{min}$ is provided for the second comparison parameter PV2 in order to thereby ensure that over a long period of time implausibly small pressure deviations for the driving state in any case lead to a change to a classification for low pressure dynamics states (change to the non-operated state of the vehicle).

It should be noted that by a staggering of the multiples and fractions, which are defined as switching boundaries for determining the driving situation of the vehicle, additional states may be defined, i.e. for example standstill, driving with low dynamics, driving with high dynamics, alert state etc. This is exemplarily illustrated by the additional boxes 110, 112 etc. of flow chart 100, by means of which various temporal distances $\Delta T_{meas3}$, $\Delta T_{meas4}$ etc. between successive detection time instants of the tire pressure measured values may be adjusted corresponding to the ascertained driving situation in order to guarantee reliable detection of the tire pressure measured values depending on driving situation and driving dynamics. Higher driving dynamics generally means higher load for the tires and also quicker temporal change of the load states for the tires and thus also the pressure dynamics states. With increased load of the tires, also the temporal distance of the transmission time instants of the tire-specific parameters should be reduced, wherein according to the invention the following applies:

$\Delta T_{send1} > \Delta T_{send2} > \Delta T_{send3} > \Delta T_{send4} \ldots$ Correspondingly, with an increased load of the tires, also the temporal distance of the detection time instants of the tire-specific parameters may be reduced, as will be explained in the following, wherein then according to the invention optionally the following applies:

$\Delta T_{meas1} > \Delta T_{meas2} > \Delta T_{meas3} > \Delta T_{meas4} \ldots$ In FIG. 5c a possible association of the ascertained tire pressure measured values with various classifications for the pressure dynamics states and thus with various driving situations of a motor vehicle is exemplarily illustrated. As illustrated in FIG. 5c, the vehicle is at first parked (cf. course VI in FIG. 5c), wherein at the time instant $t_a$ the vehicle begins to drive. This leads to a change of the classification of the pressure dynamics states and thus to a change of state of the ascertained driving situation, i.e. to a change of the temporal distance $\Delta T_{send}$ from $\Delta T_{send1}$ to $\Delta T_{send2}$ between successive transmission time instants of the tire pressure measured values, after the difference squares have exceeded eight times their averages three times in a row. This (purely exemplarily chosen) criterion for the tire pressure dependent driving situation parameter P1 and the first and second comparison parameters PV1, PV2 leads to a change of the classification and thus the sensed driving situation to the classification for high pressure dynamics states (the driving state). The upper limit for the maximum value of the short-time average $PV1_{max}$, which is still taken into account in the criterion, lies at the value of 8, i.e. eight times the short-time average thus corresponds to a value of 64 for the deviation square.

As illustrated in FIG. 5c, the vehicle drives for about two hours (cf. course VI in FIG. 5c), wherein the vehicle is again parked shortly before the time instant $t_b$. This again leads to a classification change after the difference squares have fallen short of their average 256 times in a row. This again purely exemplarily chosen criterion leads to a classification change to the classification for low pressure dynamics states (non-operated state), so that the temporal distance between successive transmission time instants of the tire pressure measured values is again adjusted to the time interval $\Delta T_{send1}$. A lower limit for the minimum value of the short-time average, which is still taken into account in the criterion, was adjusted to a value of 32 in the embodiment illustrated in FIG. 5c.

It should be noted that with the change to the classification for low pressure dynamics states the average filter (IIR filter) for the difference squares is preferably again reset to a starting value representing the noise of the tire pressure sensor and electronics used for the measurement. This is required to avoid that with renewed driving away of the vehicle the tire pressure monitoring system remains in a classification for low pressure dynamics states unnecessarily long due to the still high short-time average of the difference squares.

Additionally or alternatively to the suitable adjustment of the temporal distance between successive transmissions of the current tire pressured measurement results of the tire pressure sensor or other tire state parameters, it is also possible with the present invention to ascertain an instantaneous driving situation of the vehicle corresponding to the respective ascertained pressure dynamics state or the respective classification of the pressure dynamics states.

Depending on the ascertained instantaneous driving situation of the vehicle, according to the invention, now also the temporal distance $\Delta T_{meas}$, ($\Delta T_{meas1}$, $\Delta T_{meas2}$ ...) between successive detection time instants of the tire pressure measured values sensed by the tire pressure measuring means may be adjusted correspondingly. In a classification for lower pressure dynamics states in the tire of the vehicle, the temporal distance between successive detection time instants is preferably chosen longer than the temporal distance between successive detection time instants in a classification for higher pressure dynamics states in the tire of the vehicle. This procedure advantageously opens up further energy-saving potential and thus a possible further increase of the life of the inventive tire pressure monitoring arrangement.

As it is now illustrated in flow chart 100 in box 102, the current tire pressure measured values are sensed at the respective adjusted temporal distances $\Delta T_{meas1}$ or $\Delta T_{meas2}$ and the tire pressure dependent driving situation parameter P1 is ascertained therefrom.

With reference to the present inventive concept for monitoring tire pressure in a vehicle tire, reference may also be made to the Nyquist theorem (also known as Shannon theorem), wherein:

$$F_s \geq 2*F_b,$$

applies, where $F_s$ represents the sampling frequency (Nyquist frequency) and $F_b$ the frequency of the signal to be sampled. It becomes clear that the sampling frequency should be at least twice the bandwidth of the sampled signal (e.g. the rate of change of a pressure course in the vehicle tire). If it is known that there is a state of low pressure dynamics in the vehicle tire in which pressure changes result contingent on changes of the ambient temperature only in the range of minutes or hours, in this state of course fewer measured values may be taken up by measurements in greater temporal distances than it is required in a state of higher pressure dynamics, in which pressure changes result from load changes by driving situations in the range of seconds in the vehicle tire.

It should be noted that depending on the conditions the inventive tire pressure monitoring method may be implemented in hardware, for example by a hardware state machine, or in software. The implementation may take place on a digital storage medium, in particular a flash memory, an EEPROM (electrically erasable programmable read-only memory) memory or a ROM (read only memory) memory or also a floppy disc or compact disc with electronically readable control signals, which may cooperate with a programmable computer system, preferably microcontroller means, so that the inventive tire pressure monitoring method is executed. In general, the invention thus also consists in a computer program product with program code stored on a machine-readable carrier for performing the inventive method, when the computer program product is executed on a computer. In other words, the invention may thus be realized as a computer program with a program code for performing the method, when the computer program is executed on a computer.

Figure 7:
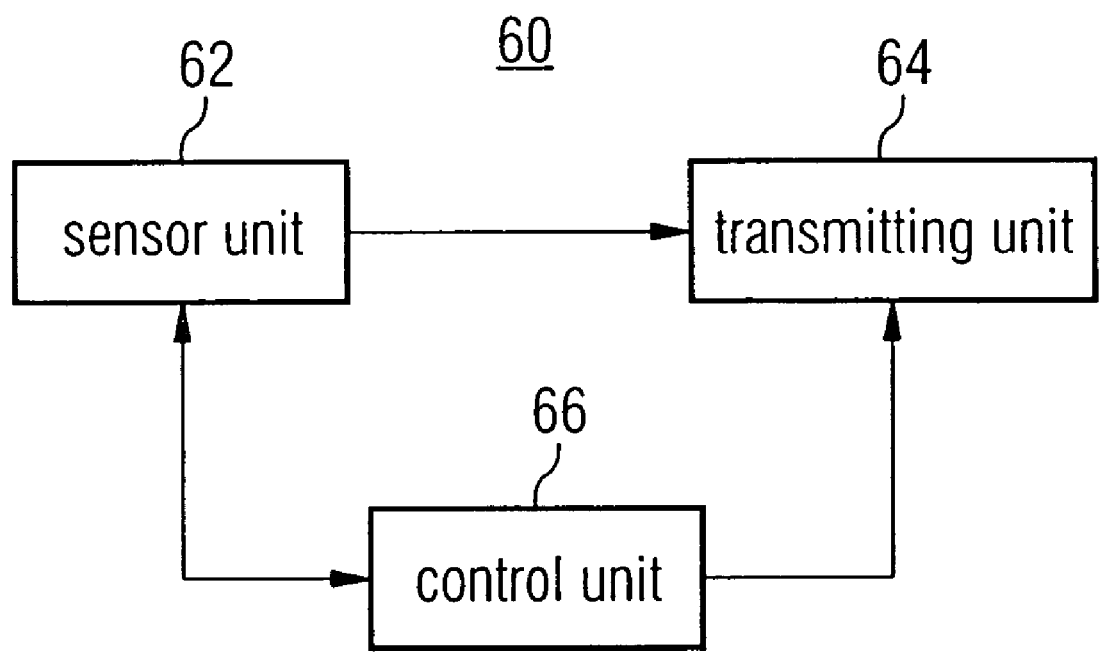
FIG. 7 is a principle illustration in block diagram form of an apparatus for monitoring tire pressure in a vehicle tire according to the present invention.

In FIG. 7 the inventive apparatus 60 for monitoring tire pressure in a tire of a vehicle is illustrated. The apparatus includes pressure measuring means 62 for sensing temporally successive tire measured values, a transmitting unit 64 for transmitting at least parts of the tire pressure measured values to a receiving unit, and a control unit 66 for controlling the frequency of the transmission of the tire pressure measured values by the transmitting unit depending on the sensed tire pressure values and/or optionally for controlling the frequency of the detection of the tire pressure measured values by the pressure measuring means 62 depending on the sensed tire pressure values.

The control unit 66 or also the pressure measuring means 62 itself may ascertain an instantaneous pressure dynamics state or classification for the pressure dynamics states in a tire of the vehicle from a plurality of preceding tire pressure measured values, wherein the temporal distance $\Delta T_{send}$ between successive transmission time instants of the tire pressure measured values and/or also the temporal distance $\Delta T_{meas}$ between successive detection time instants of the tire pressure measured values may be adjusted depending on the ascertained instantaneous pressure dynamics states and thus on the driving situation.

The inventive apparatus 60 for monitoring the tire pressure is preferably arranged in the rim inside of the vehicle wheel, so that the apparatus may detect the required physical quantities to be sensed, such as pressure and temperature, of the gas filling of the vehicle tire.

In summary, it can be determined that by the inventive method and the inventive apparatus for monitoring tire pressure in a vehicle tire, a pressure sensor IC may be employed, the power consumption of which is so low that continuous measurement of pressure and temperature may take place with a fixed measuring rate over the intended life of the system. This measuring rate is fixed by the time interval in which a change of the tire pressure is to be recognized at the latest. The main power consumption in such a tire pressure sensor system is then determined by the transmitting means serving for the transmission of current tire pressure measured values to a distant terminal taking over the further processing of the tire pressure measured values. The mean power consumption of the system may thus be controlled via the switch-on frequency of the transmitting unit. In contrast to the systems customary in the prior art, in which the measurement frequency and the transmission frequency depend on a driving state sensed via an additionally arranged acceleration sensor or movement switch, the inventive system may evaluate the course of the tire pressure and decide based on these measured data, which updating rate is required for the communication of current tire pressure measured values and/or which detection rate is required for the ascertainment of current tire pressure measured values.

By the inventive concept for monitoring tire pressure in a tire of a vehicle, a series of advantages result.

With battery-operated tire pressure sensor arrangements the required measurements of the tire pressure may be guaranteed over the entire intended life lying on the order of ten years of a tire pressure sensor arrangement, because the tire pressure sensor arrangement is in a power saving operation so that the power consumption of the arrangement is extremely low as long as no critical change of the tire pressure occurs. However, if a critical change of the tire pressure occurs, which indicates gas loss or damage of the tire, a time interval as short as possible between the communicated current tire pressure measured values is used to be able to recognize changes of the tire pressure in an extremely reliable and very quick manner, evaluate these, and display them to the driver if required.

According to the invention, it is also made possible that the temporal distances $\Delta T_{send}$ between successive transmission time instants and/or also the temporal distances $\Delta T_{meas}$ between successive detection time instants of the tire pressure measured values, the temperature, or further tire-specific parameters may be changed depending on the instantaneously ascertained driving dynamic state in a tire of the vehicle, in order to also have a more frequent check of the tire-specific parameters take place for security reasons in driving states with rising tire stresses, to be able to recognize damage, pressure loss, etc. of the vehicle tire as early as possible and display this to the driver.

Since in the present invention also a tire pressure change dependent parameter derived from the sensed tire pressure measured values is used, from which the physical state parameters, i.e. the pressure in the tire depending on the driving state of the vehicle may be inferred, for the detection of the driving state of the vehicle, in the present invention no additional acceleration sensor or movement switch is required, the evaluation of which on the one hand means additional expenditure in terms of circuit engineering, and thus on the other hand would increase the current consumption, i.e. the power consumption, of the tire pressure sensor arrangement.

In the present invention it is also made possible that the current tire pressure measured values (and also other evaluated data) are regularly transmitted to a central unit in the vehicle, e.g. the on-board computer, with a default minimum frequency to enable the central unit to monitor the functionality of the tire pressure sensor arrangement. On the other hand, the present invention enables pressure changes to be communicated to the central unit extremely early, so that damage of the tire may be recognized as early as possible.

Furthermore, the present invention enables, in addition to the current tire pressure measured value, further information to be communicated to the central unit, which may then be evaluated in a sensible manner, when the tire pressure is sensed in a known, e.g. constant, time interval. This additional information is for example low-pass filtered pressure values or sliding averages of the sensed tire pressure measured values, the deviation of the measurement of the tire pressure measured values from the preceding value or a low-pass filtered or averaged value, or for example statistical values on the basis of the sensed tire pressure measured values, such as sample statistics for gradients or variances of the measured values over a certain observation period.

This additional data may for example be employed in making an exact assessment of the tire state over a longer period of time.

While this invention has been described in terms of several preferred embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

What is claimed is:

1. A method of monitoring tire pressure of a tire of a vehicle, in which temporally successive tire pressure measured values are sensed by a pressure detector, and at least part of the tire pressure measured values is transmitted from a transmitter to a receiver with a variable frequency of occurrence, wherein the frequency of occurrence is derived from the sensed tire pressure measured values, the method comprising the steps of:

decrementing or incrementing a count of counter beginning with a starting value;

comparing the count with a tire pressure change dependent parameter derived from the sensed tire pressure measured values; and triggering a transmission when the count reaches the tire pressure change dependent parameter.

2. The method of claim 1, wherein from a plurality of tire pressure measured values a tire pressure change of the tire is ascertained, wherein the temporal distance between successive detection time instants of the tire pressure measured values is adjusted depending on the ascertained tire pressure change of the tire.

3. The method of claim 1, wherein the frequency of occurrence is derived from a pressure course obtained from several temporally successive tire pressure measured values.

4. The method of claim 3, wherein the frequency of occurrence is derived from a change of the pressure course.

5. The method of claim 3, wherein statistics with statistical values from the pressure course is made, and the frequency of occurrence is derived from the statistical values.

6. The method of claim 1, wherein the detection of the tire pressure measured values takes place in fixed temporal distances.

7. The method of claim 1, wherein a counter is decremented beginning with a starting value;

the count is compared with a tire pressure change dependent parameter derived from the sensed tire pressure measured values; and the transmission is triggered when the count reaches or falls short of the parameter.

8. The method of claim 7, wherein the counter is reset to a starting value after each transmission.

9. The method of claim 1, wherein the count is incremented after each detection of the tire pressure measured value and increased by a parameter derived from the sensed tire pressure measured values; and the transmission is triggered when the count reaches or exceeds a default value.

10. The method of claim 1, wherein the count is incremented after each detection of the tire pressure measured value and multiplied by a parameter derived from the sensed tire pressure measured values; and the transmission is triggered when the count reaches or exceeds a default value.

11. The method of claim 1, wherein the count of the counter is changed with an increment or decrement dependent on the count, so that the count does not change in a linear manner.

12. The method of claim 11, wherein the count is weighted with a nonlinear function.

13. The method of claim 11, wherein the nonlinear function is generated by a step response or an impulse response of a digital filter.

14. The method of claim 1, wherein the parameter derived from the sensed tire pressure measured values is the difference or the magnitude of the difference of two successive tire pressure measured values.

15. The method of claim 1, wherein the parameter derived from the sensed tire pressure measured values is the square of the difference of two successive tire pressure measured values.

16. The method of claim 1, wherein the parameter derived from the sensed tire pressure measured values is the difference or the magnitude of the difference of the sensed tire pressure measured values to a low-pass filtered or averaged value of the plurality of the sensed tire pressure measured values.

17. The method of claim 1, wherein the parameter derived from the sensed tire pressure measured values is the square of the difference of the tire pressure measured value to a low-pass filtered or averaged value of a plurality of tire pressure measured values.

18. The method of claim 1, wherein the parameter derived from the sensed tire pressure measured values is the standard deviation of a plurality of past tire pressure measured values.

19. The method of claim 1, wherein the parameter derived from the sensed tire pressure measured values is an averaged or filtered value.

20. The method of claim 1, wherein the counter is reset to a starting value after each transmission.

21. The method of claim 1, wherein the tire pressure change dependent parameter is derived in form of a statistical measured quantity from the sensed tire pressure measured values, and the transmission is triggered when the current tire pressure measured value exceeds the statistical measured quantity.

22. The method of claim 1, wherein the tire pressure change dependent parameter is derived in form of a statistical measured quantity from the sensed tire pressure measured values, and the transmission is triggered when the statistical measured quantity exceeds a default value.

23. The method of claim 1, wherein the tire pressure measured values are converted into temperature-compensated tire pressure measured values from which the frequency of occurrence is derived, by means of sensed temperature values.

24. The method of claim 1, wherein also further ascertained physical or statistical data related to the tire pressure are communicated in the transmission of a tire pressure measured value.

25. The method of claim 24, wherein the data includes a difference of two successive tire pressure measured values, a low-pass filtered tire pressure measured value, an average averaged over several past tire pressure measured values, the standard deviation with reference to a mean value, the average of the noise with reference to a mean value of the tire pressure measured values and/or a quotient of the tire pressure measured value and the temperature value.

26. A method of monitoring tire pressure in a tire of a vehicle, wherein tire pressure measured values are sensed by a pressure detector at successive measuring time instants, and the tire pressure measured values are transmitted from a transmitter to a receiver at successive transmission time instants, wherein the distance between successive measuring time instants and/or the distance between successive transmission time instants is adjustable and is derived from the sensed tire pressure measured values, comprising the steps of:
  sensing a plurality of tire pressure measured values;
  ascertaining an instantaneous pressure dynamics state in the tire occurring as a result of the instantaneous driving situation of the vehicle from the plurality of tire pressure measured values, comprising the following substeps:
    evaluating a plurality of successive tire pressure measured values to obtain a tire pressure dependent driving situation parameter;
    comparing the tire pressure dependent driving situation parameter with a comparison parameter; and
    ascertaining the instantaneous pressure dynamics state from the comparison; and
  adjusting the measuring time instants or the transmission time instants corresponding to the ascertained instantaneous pressure dynamics state.

27. The method of claim 26, wherein the different pressure dynamics states are categorized into different classes.

28. The method of claim 27, wherein the transitions between the different classes of the pressure dynamics states are derived from the ascertained tire pressure measured values.

29. The method of claim 26, wherein the frequency of occurrence of the transmission is adjusted depending on the ascertained pressure dynamics states by adjusting different time intervals between the transmissions.

30. The method of claim 26, wherein the temporal distance between successive detection time instants of the tire pressure measured values is adjusted depending on the different pressure dynamics states.

31. The method of claim 30, wherein the temporal distance between successive detection time instants is smaller than or equal to the time interval during which a transition between different pressure dynamics states is to be recognized.

32. The method of claim 26, wherein the detection of the tire pressure measured values takes place in fixed temporal distances.

33. The method of claim 26, wherein the parameter derived from the sensed tire pressure measured values is obtained by high-pass or band-pass filtering of the tire pressure measured values.

34. The method of claim 33, wherein the high-pass or band-pass filtered value is squared to obtain the parameter derived from the sensed tire pressure measured values.

35. The method of claim 33, wherein the magnitude of the high-pass or band-pass filtered value is formed to obtain the parameter derived from the sensed tire pressure measured values.

36. The method of claim 26, wherein the pressure dynamics states in the vehicle tire are subdivisible into a plurality of classes of pressure dynamics states, wherein depending on the class the temporal distance between successive transmission time instants of the tire pressure measured values is changed.

37. The method of claim 36, wherein the temporal distance between successive transmission time instants is smaller than or equal to the time interval during which a transition between different classes of the pressure dynamics states is to be recognized.

38. The method of claim 36, further comprising:
  evaluating a plurality of successive tire pressure measured values to obtain a tire pressure dependent driving situation parameter;
  comparing the tire pressure dependent driving situation parameter with a first comparison parameter and a second comparison parameter; and
  adjusting the temporal distance between successive transmission time instants of the tire pressure measured values for a first class of the pressure dynamics states when an exceeding of the first comparison parameter occurs; and
  adjusting the temporal distance between successive transmission time instants of the tire pressure measured values for a second class of the pressure dynamics states when an under run of the second comparison parameter occurs.

39. The method of claim 38, wherein the first and second comparison parameters are ascertained from a plurality of past tire pressure measured values.

40. The method of claim 38, wherein the first and second comparison parameters coincide.

41. The method of claim 38, wherein the first class of the pressure dynamics states represents a driving state of the vehicle and the second class of the pressure dynamics states a non-operated state of the vehicle.

42. An apparatus for monitoring tire pressure in a tire of a vehicle, comprising:
- a pressure detector for detecting temporally successive tire pressure measured values,
- a transmitter for transmitting at least part of the tire pressure measured values to a receiver,
- a controller for controlling the frequency of occurrence of the transmission of the tire pressure measured values by the transmitter depending on the sensed tire pressure measured values, wherein the controller further comprises:
  - a counter whose count is decrementable or incrementable beginning with a starting value;
  - a comparator for comparing the count with a tire pressure change dependent parameter derived from the sensed tire pressure measured values; and
  - a trigger for triggering a transmission by the transmitter when the count reaches the tire pressure change dependent parameter.

43. An apparatus for monitoring tire pressure in a tire of a vehicle, wherein tire pressure measured values are detectable by a pressure detector at successive measuring time instants, and the tire pressure measured values are transmissible from a transmitter to a receiver at successive transmission time instants, wherein the distance between successive measuring time instants and/or the distance between successive transmission time instants is adjustable and derivable from the sensed tire pressure measured values, comprising:
- a tire pressure detector for detecting a plurality of tire pressure measured values;
- a transmitter for transmitting the tire pressure measured values to a receiver;
- a first controller for ascertaining an instantaneous pressure dynamics state in the tire occurring as a result of the instantaneous driving situation from the plurality of tire pressure measured values, further comprising:
  - an evaluator for evaluating a plurality of successive tire pressure measured values to obtain a tire pressure dependent driving situation parameter;
  - a comparator for comparing the tire pressure dependent driving situation parameter with a comparison parameter; and
  - a second controller for ascertaining the instantaneous pressure dynamics state from the comparison,
- an adjuster for adjusting the measuring time instants or the transmitting time instants according to the ascertained instantaneous pressure dynamics state.

* * * * *